United States Patent [19]
Joppen et al.

[11] Patent Number: 6,103,163
[45] Date of Patent: Aug. 15, 2000

[54] PROCESSES AND APPARATUSES FOR PERFORATING SMOOTH, CLOSED-CELL SURFACES OF OPEN-CELL PLASTIC FOAM SHEETS

[75] Inventors: Henk Joppen, Eindhoven; Paul Daniels, Weert; Jan op den Buijsch, Budel-Dorplein, all of Netherlands

[73] Assignee: Depron B.V., Weert, Netherlands

[21] Appl. No.: 09/024,426

[22] Filed: Feb. 17, 1998

Related U.S. Application Data

[62] Division of application No. 08/569,940, Dec. 8, 1995, Pat. No. 5,720,915.

[30] Foreign Application Priority Data

| Dec. 23, 1994 | [DE] | Germany | 44 46 442 |
| Jun. 2, 1995 | [DE] | Germany | 195 20 293 |
| Jun. 2, 1995 | [DE] | Germany | 195 20 294 |

[51] Int. Cl.⁷ .......................... B26F 1/24; B29C 51/108; B29C 51/36
[52] U.S. Cl. .......................... 264/210.2; 264/321; 83/866; 83/867; 83/868; 425/290; 425/384; 425/385; 425/388
[58] Field of Search .................. 83/866, 867, 868; 425/302.1, 305.11, 290, 324.1, 385, 388, 384, DIG. 119; 206/204; 264/321, 210.2

[56] References Cited

U.S. PATENT DOCUMENTS

| 2,068,456 | 1/1937 | Hooper | 83/867 |
| 2,611,434 | 9/1952 | Mugler | 83/171 |
| 3,308,213 | 3/1967 | Carrigan et al. | 425/388 |
| 3,396,430 | 8/1968 | Westcott | 425/290 |
| 3,450,326 | 6/1969 | Foote | 264/321 |
| 3,550,212 | 12/1970 | Gray | 425/290 |
| 3,610,509 | 10/1971 | Winstead | 229/406 |
| 3,755,523 | 8/1973 | Straub et al. | 425/388 |
| 3,974,722 | 8/1976 | Florian | 83/861 |
| 4,273,738 | 6/1981 | Spengler | 425/290 |
| 4,342,549 | 8/1982 | Lemelson | 425/324.1 |
| 4,413,964 | 11/1983 | Winstead | 425/388 |
| 4,552,600 | 11/1985 | Laiewski et al. | 156/73.1 |
| 4,669,969 | 6/1987 | Martelli et al. | 425/388 |
| 4,715,473 | 12/1987 | Tschudin-Mahrer | 181/286 |
| 4,980,100 | 12/1990 | Krishnakumar et al. | 264/156 |
| 5,020,770 | 6/1991 | Moberg | 249/111 |
| 5,207,733 | 5/1993 | Perrin | 47/87 |

FOREIGN PATENT DOCUMENTS

| 1142069 | 9/1957 | France | 83/866 |
| 1 596 691 | 7/1970 | France . | |
| 2 041 488 | 1/1971 | France . | |
| 1460144 | 9/1969 | Germany | 425/388 |
| 1 629 155 | 1/1971 | Germany . | |
| 3406399 | 8/1985 | Germany | 206/204 |
| 34 45 656 | 6/1986 | Germany . | |
| 4039354 | 6/1992 | Germany | 206/204 |
| 41 20 319 | 12/1992 | Germany . | |
| 42 34 632 | 4/1994 | Germany . | |
| 44 23 283 | 1/1996 | Germany . | |
| 1 128 977 | 10/1968 | United Kingdom . | |
| WO86/07036 | 12/1986 | WIPO | 206/204 |

OTHER PUBLICATIONS

Rene Bender, "Handbook of Foamed Plastics", Lake Publishing Co., p. 79, 1965.
Patent Abstracts of Japan, vol. 10, No. 40, (M–454), Feb. 18, 1986, and JP–A–60 192615, published Oct. 1, 1985.

Primary Examiner—Robert Davis
Attorney, Agent, or Firm—Foley & Lardner

[57] ABSTRACT

Open-cell plastic foam sheets with smooth, closed surfaces are heated up to a predetermined temperature after extrusion, are thermoformed in a thermoforming unit with the aid of a vacuum on both sides and are thermoset. One of the two closed surface skins of the plastic foam sheet is perforated with the aid of needles 4 arranged movably in a mold block 11. The mold block 11 is a component part of a thermoforming unit 10 and, together with a further mold block 9, forms the mold of this thermoforming unit. The mold block 11 for the inner side 13 of a plastic foam sheet 16 includes a male mold 1, a cooling plate 2, a vacuum plate 3, the movable needles 4, a needle plate 5, springs 6 for the return of the needle plate and also diaphragms 7 and a mounting plate 8, which are held together by screws 30.

14 Claims, 7 Drawing Sheets

PROCESSES AND APPARATUSES FOR PERFORATING SMOOTH, CLOSED-CELL SURFACES OF OPEN-CELL PLASTIC FOAM SHEETS

This application is a divisional of application Ser. No. 08/569,940, filed Dec. 8, 1995 and now U.S. Pat. No. 5,720,915.

BACKGROUND OF THE INVENTION

1. Field of the Invention

The invention relates to processes and apparatuses for perforating smooth, closed surfaces of open-cell plastic foam sheets. The plastic foam sheets with open-cell core are thermoformed into products, for example, such as trays or containers.

2. Description of the Related Art

For the production of packaging material, such as for example packaging trays, open-cell plastic foam sheets are used, which in contrast to plastic foam sheets with closed cells, are capable of absorbing liquids.

Plastic foam sheets are generally produced by a thermoplastic material being extruded together with a blowing agent, in particular a blowing gas, from an annular or slot-shaped or coextrusion die. Shortly after leaving the extrusion die, the blowing agent finely distributed in the plastic expands so that extremely fine bubbles form in the plastic foam body. Depending on process conditions with regard to the temperature and extrusion rate, bubbles of various sizes are obtained. Accordingly, the plastic foam sheet thus produced contains closely packed, closed, gas-filled cells, the gas enclosed in the cells generally being air and/or remains of the blowing agent. Such closed-cell plastic foam sheets have excellent insulating properties which are essentially attributable to the closely packed, closed, gas-filled cells.

A plastic foam sheet in which the cells are not closed but open, i.e., continuous, behaves differently than closed cells. Such a plastic foam sheet can, for example, absorb and store liquids, similar to a sponge. Such open-cell plastic foam sheets are generally produced by means of a tandem extrusion line. These plastic foam sheets are provided with a thin, closed-cell skin on the inner side and outer side. This skin is necessary in order to ensure a good thermal molding of the plastic foam sheet into a tray product. However, in order that liquid can be absorbed by the tray products produced, it is necessary to perforate the surface skin at certain points.

The plastics of the foam sheet may include polyolefins, such as polyethylene (HDPE, LPE, LLTP), chlorinated polyethylene, polypropylene (PP), polypropylene copolymers (PPC), ethylene-vinyl acetate copolymers (EVA), halogenated polyolefins; styropolymers, such as polystyrene (PS), polystyrene copolymers (PSC), acrylonitrile-butadiene-styrene copolymers (ABS), styrene-maleic anhydride, toughened polystyrenes (SPS); polyesters, such as polyethylene terephthalate (PET), polyethylene-glycol terephthalate (PETP), polybutylene terephthalate (PPT); from ethylene-propylene polymer, polyvinylchloride (PVC) and/or polyphenylene oxide.

Furthermore, the plastic may include copolymers or blends of thermoplastic polymers, of polymers, copolymers or blends of thermoplastic polymers and/or copolymers.

SUMMARY OF THE INVENTION

One object of the invention is to provide processes and apparatuses by means of which a reliable and quick perforation of the smooth, closed surface skin of a product thermoformed from a plastic foam sheet can be performed in order to obtain access to the open-cell structure of the plastic foam sheet beneath the surface. Reliable perforation is to be ensured even if dimensional deviations occur in the products as a consequence of shrinkage and/or changes in the length or lay of the sheet.

In order to achieve the foregoing and other objects, there has been provided according to one aspect of the present invention, a process for perforating an extruded open-cell plastic foam having two smooth closed surfaces, which comprises: heating the extruded foam sheet to a predetermined temperature; thermoforming the sheet into a predetermined configuration to form a molded thermoformed foamed plastic sheet; thermosetting the thermoformed foam sheet; and perforating one of the smooth, closed surface by needle means, wherein the heating, thermoforming and thermosetting occur before or after the perforation. In a preferred embodiment, the needle means comprise one or more needles.

In yet another preferred embodiment, the perforating further comprises arresting the plastic foam and moving the one or more needles from an initial position to a position which pierces the surface skin of the arrested foam plastic sheet.

In still another preferred embodiment, the perforating further comprises moving a mold block, having the one or more needles with projecting needle tips disposed in a fixed position therein, toward the surface skin of the plastic foam having the outer side bearing against a backing plate to such an extent that the needle tips perforate the surface skin.

In another preferred embodiment, the needle means are needles mounted on a rotating roller and the one of the two smooth closed surfaces is perforated by the rotating roller before the heating, thermoforming and thermosetting.

In still another preferred embodiment, the thermoformed molded foam is a tray or container having side walls and a bottom surface, and the perforating further comprises perforating the side walls and bottom surface with said needles in a direction perpendicular to side walls and bottom. In a preferred aspect of this embodiment, the needles are displaceably mounted in retracted configuration in a male mold of the thermoforming unit. The needles are extended from the male mold by means of a compressed gas and are retracted into the male mold by spring means when the compressed gas is terminated. The perforating further comprises: supplying the compressed air to the needles to extend the needles from the male mold; perforating the tray or container; and terminating the compressed air to retract the needles into the male mold.

In yet another preferred embodiment, the perforating further comprises: transporting the thermoformed plastic sheet out of a thermoforming unit and into a perforating station. The perforation station comprises a fixed pressure plate, at least one displaceable perforating block and at least one needle plate having the needle means mounted thereon and the needle plate is mounted below the perforating block. The process further comprises pressing the thermoformed foam sheet against the fixed pressure plate by the at least one perforating block; and raising the at least one needle plate in a freely suspended manner by means of a pressure medium against the at least one perforating block to press the needle tips against the thermoformed plastic foam to pierce the surface of the smooth closed surface which is in at least partial contact with the at least one perforating block.

According to another aspect of the present invention, there has been provided an apparatus for perforating one or more smooth, closed surfaces of open-cell plastic foam sheets. The apparatus comprises a part with movable or fixed needles arranged thereon in a matrix arrangement. The part is adapted such that during a perforation operation the needles with needle tips project from the surface of the part to such an extent that they pierce a surface skin of the plastic foam sheet. In a preferred embodiment, the part comprises a movable mold block of a thermoforming unit, adapted for molding an inner side of the plastic foam sheet, wherein the thermoforming unit further comprises a further mold block, adapted for molding an outer side of the plastic foam sheet, and wherein the movable needles or fixed needles arranged in the movable mold block are adapted for perforating the inner side.

According to another preferred embodiment, the part is movable and has fixed needles and comprises a mold block which comprises a cooling plate, a mounting plate and a male mold with the ends of the fixed needle anchored therein and the tips of the fixed needles projecting outward from the male mold, and wherein the mold block is disposed in a thermoforming device. In another variant of this embodiment, the part is arranged outside the thermoforming unit in a thermoforming device and comprises a male mold with fixed needles, wherein the male mold with the projecting needle tips is adapted to be pressed against and perforate the inner side of thermoformed trays formed in the thermoforming unit, and wherein the apparatus further comprises a backing plate disposed such that the outer side of the tray bears against the backing plate during the perforation of the tray.

In still another preferred embodiment, the part comprises a rotating roller with fixed needles attached thereto, with needle tips projecting from the roller surface. The needle roller is arranged at the inlet of a thermoforming unit or at the outlet of an extruder, in order to perforate the surface skin of the plastic foam sheets before the sheets are thermoformed.

In yet another preferred embodiment, the part comprises a fixed mold block which is adapted for molding the side walls and the bottom of a tray or a container from a plastic foam sheet. The fixed mold block comprises a fixed base plate with mutually parallel channels disposed in the base plate and lying one above the other and adapted for transporting a cooling medium, vacuum and a pressure medium, and a male mold having needle pistons with the needles thereon. The needles extend perpendicularly from their positions within the male mold onto the side walls and the bottom lying opposite the surface of the male mold.

In still another preferred embodiment, the apparatus further comprises a base frame with vertical guide rods, a pressure plate mounted in a fixed position on the guide rods, and the part comprises a mounting plate displaceably arranged along the guide rods and which has a mold block mounted thereon. The mold block comprises one or more perforating blocks, which contain the needles, and a base plate.

Further objects, features and advantages of the present invention will become apparent to those skilled in the art from the description of the preferred embodiments which follow.

BRIEF DESCRIPTION OF THE DRAWINGS

The invention is explained in more detail below with reference to exemplary embodiments of the apparatus represented in the drawing, in which.

DETAILED DESCRIPTION OF THE PREFERRED EMBODIMENTS

Figure 1:
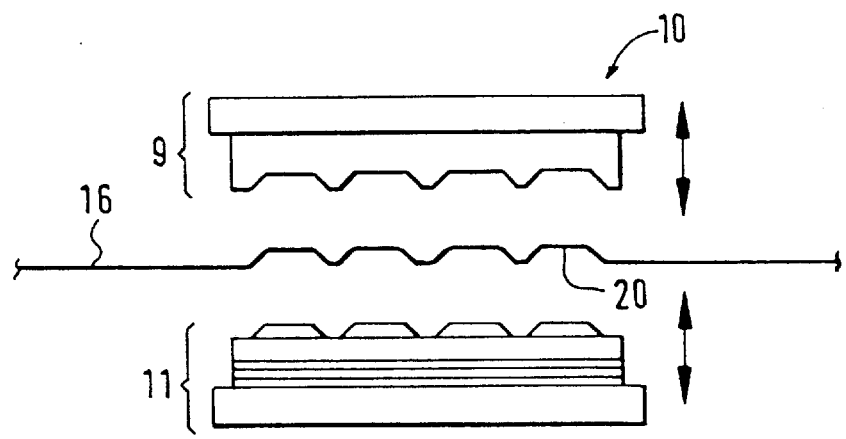
FIG. 1 shows a diagrammatic sectional representation of a thermoforming unit according to the present invention, of which a mold block is provided with movable needles for the perforation of a plastic foam sheet molded into a tray.

The process according to the present invention comprises heating up an extruded plastic foam sheet to a predetermined temperature, and then thermoforming the sheet in a thermoforming unit with the aid of a vacuum on both sides and subsequently thermosetting the sheet. One of two closed surface skins of the plastic foam sheet is then perforated by means of needles. In this case, the needling can take place before or after the thermoforming of the plastic foam sheet.

In a preferred embodiment of the process, the plastic foam sheet can be coextruded together with a colored outer layer of the same or a different material as the plastic foam sheet. The foam sheet can then be heated up, thermoformed in a thermoforming unit with the aid of a vacuum on both sides and thermoset. The outer layer is then perforated as far as the surface of the plastic foam sheet by means of needles. In another preferred embodiment, it is possible for the plastic foam sheet to be extruded from colored material. In this case, the coextrusion of a colored outer layer is not required.

In another preferred embodiment of the process according to the invention, the needles are moved back and forth during the perforation, and the needle tips pierce the surface skin of the arrested or stationary plastic foam sheet. In another preferred embodiment of the process, the needles are fitted in fixed position in a mold block and the projecting needle tips are moved toward the inner side of the plastic foam sheet to such an extent that they perforate its surface skin, the outer side of the plastic foam sheet bearing against a stationary surface, such as a backing plate.

In still another embodiment, it is similarly possible for one of the closed surface skins of the plastic foam sheet to be perforated before the heating up and thermoforming with the aid of needles which are fitted on a rotating roller.

In still another embodiment of the process according to the present invention, after the cooling of the product molded in a thermoforming unit, one of two closed surface skins of the side walls and the bottom of the product located in the thermoforming unit is perforated by means of needles perpendicularly with respect to the surfaces of the side walls and of the bottom.

In another preferred embodiment of the process according to the invention, the side walls and the bottom are perforated to the same or different depths, with the needle tips penetrating into the inner sides of the product to a preselected depth, preferably 2.5 to 3 mm.

In another embodiment of the process according to the present invention, the needles are extended from a male mold by means of compressed air at the beginning of perforation, and, at the end of perforation, after switching off the compressed air, the needles are retracted into the male mold by means of spring pressure.

In still another preferred embodiment according to the present invention, the thermoformed plastic foam sheet is transported out of a thermoforming unit into the perforation station, and in the latter is pressed against a fixed pressure plate by means of displaceable perforating blocks. A needle plate is raised in a freely suspended manner by means of a pressure medium against the perforating blocks in order to press the needle tips of the needles anchored in the needle plate against the molded plastic foam sheet and to pierce the surface of the latter bearing against the perforating blocks In a further embodiment of this process, when raising the perforating blocks until they are sealed tight with the products molded in the plastic foam sheet, the perforating blocks center themselves in the molded products while being suspended. In this embodiment, the perforating blocks are raised against the fixed-in-place pressure plate, with a lift which can be set, by displacement means, preferably electropneumatic or electromechanical drive cylinders.

According to another aspect of the present invention, an apparatus is provided for perforating smooth, closed surfaces of open-cell plastic foam sheets. The apparatus is configured in such a way that it is a movable or fixed part which is provided with movable or fixed needles preferably in a matrix arrangement, whose needle tips project during the perforation operation from the surface of the part to such an extent that they pierce the surface skin of the plastic foam sheet.

In one embodiment of the apparatus, the part is a movable mold block, which molds an inner side of the plastic foam sheet, of a thermoforming unit. The thermoforming unit has a further mold block, which molds an outer side of the plastic foam sheet, and there are movable needles or fixed needles arranged in the mold block for the inner side.

In another preferred embodiment of the invention, the mold block for the inner side comprises a male mold, a cooling plate, a vacuum plate, movable needles, needle plates, springs for the return of the needle plates, diaphragms and a mounting plate, which are held together by screws.

The mold block for the outer side of the plastic foam sheet preferably has a female mold, whose surface bearing against the outer side is preferably designed to be complementary to the surface of the male mold bearing against the inner side.

The apparatus is advantageously designed such that the mold blocks are movable toward each other to within a distance corresponding to the adjustable wall thickness of a tray thermoformed from the plastic foam sheet. The wall thickness of the individual tray is preferably about 3.0 to 6.5 mm.

In another preferred embodiment, an apparatus for perforating smooth, closed surfaces of open-cell plastic foam sheets which are thermoformed into products such as trays and containers includes a fixed mold block which molds the side walls and the bottom of a tray or of a container from a plastic foam sheet. The mold block has a fixed base plate with mutually parallel channels lying one above the other for a cooling medium, vacuum and a pressure medium and a male mold in which there are needle pistons which are directed perpendicularly onto the side walls and the bottom in their positions within the male mold lying opposite the side walls and the bottom.

Preferably, a distributor channel is provided on the underside of the male mold which is connected via at least one vertical bore to the channel for the pressure medium. Furthermore, the channel for the vacuum is in connection with the interior of the male mold via at least two vertical vacuum connection bores.

Preferably the needle pistons are in connection with the distributor channel, so that each needle piston can be subjected to compressed air.

In another preferred embodiment, the apparatus for perforating smooth, closed surfaces of plastic foam sheet with an open-cell core comprises a base frame with vertical guide rods, a mounting plate which can be displaced along the guide rods and on which there are arranged a mold block comprising perforating blocks which contain needles, and a base plate, as well as a pressure plate mounted in fixed position on the guide rods. Electropneumatic or electromechanical drive cylinders are arranged on the base frame. The cylinders include piston rods which bear against the underside of the mounting plate in order to raise or lower the latter.

The pressure plate can preferably be set in its height on the guide rods. It is in each case fixed in position at the set height by means of screw nuts.

The plastic foam sheet thermoformed into products bears against the underside of the pressure plate such that the perforating blocks center themselves in the molded products directly before the perforation.

This embodiment achieves the advantage that, when raising the perforating blocks against the molded products in the plastic foam sheet which bears against the underside of the pressure plate, the perforating blocks center themselves in the molded products, so that small deviations of a few millimeters which occur, caused by shrinkage of the plastic foam sheet and changes in the length of lay of the sheet web, can be compensated.

Description of the preferred embodiments is now made with reference to FIGS. 1–10. FIG. 1 diagrammatically shows the perforation of a plastic foam sheet 16 in a thermoforming unit 10, which comprises two mold blocks 9 and 11. The two mold blocks 9 and 11 can be moved back and forth perpendicularly with respect to the transporting direction of the plastic foam sheet 16. The upper mold block 9 contains a female mold, as is described in greater detail below, by means of which the outer side of the product produced from the plastic foam sheet, for example a tray 20, is molded. The lower mold block 10 contains, inter alia, a male mold, by means of which the inner side of the product is molded. The cross sections of the female mold and of the male mold are preferably designed to complement each other.

For molding the plastic foam sheet 16 in the thermoforming unit 10, the plastic foam sheet is first heated up to a certain temperature in a heating means such as an infrared heating oven (not shown). Other heating means known to those skilled in the art can also be used. Thereafter, the heated-up section of the plastic foam sheet 16 passes into the thermoforming unit 10, whose mold blocks 9 and 11 are closed. This means that the female mold and male mold have approached each other to within a small distance, preferably about 5 mm. The plastic foam sheet is preferably thermoformed simultaneously on both sides, by means of a vacuum acting on both sides, to which the mold blocks 9 and 11 or the female mold and male mold are subjected. Both the female mold and the male mold are preferably cooled by means of water or some other liquid, i.e., kept at a certain temperature which is necessary in order to ensure the setting of the product molded from the plastic foam sheet. Other cooling means may also be employed. The setting of the product ensures that the shape is retained. After the elapse of a certain vacuum time and cooling time in the still closed mold blocks 9 and 11 of the thermoforming unit 10, the perforation of the smooth, closed surface skin of the internally open-cell plastic foam sheet 16, or the tray 20 molded therefrom, takes place. For this purpose, in the lower mold block 11 there are provided movable needles 4, which are extended by means of a compressed gas, preferably compressed air.

Figure 2:
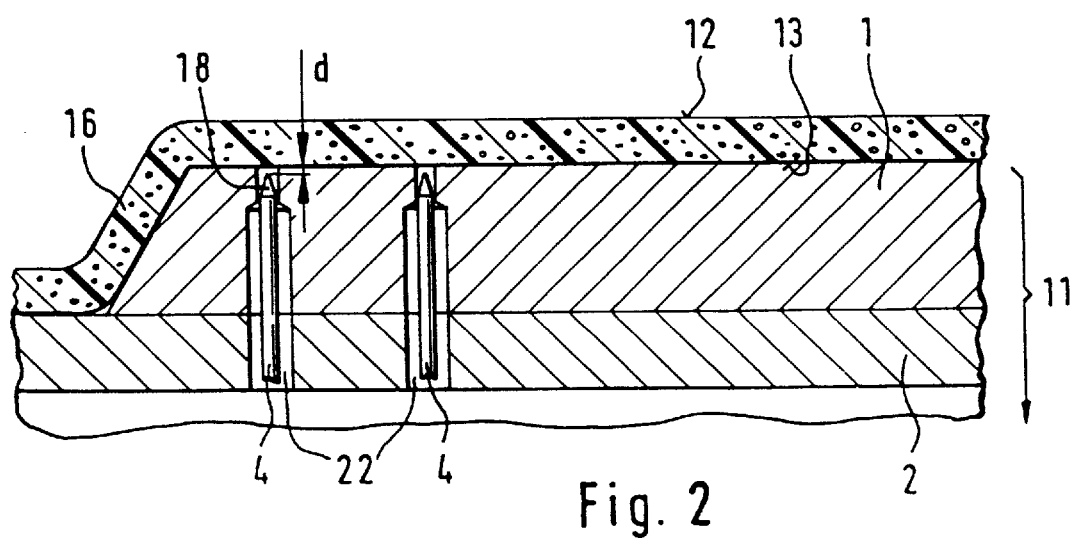
FIG. 2 shows a section through a male mold and a cooling plate as sub-elements of a mold block with movable needles of the apparatus according to one embodiment of the present invention.

As the partial section of the mold block 11 in FIG. 2 reveals, for perforating the thermoformed plastic foam sheet 16 or the trays 20 molded therefrom, the movable needles 4 are preferably mounted such that in the neutral position they terminate with their needle tips 18 either substantially at the surface of the male mold 1 or are located at a distance d of preferably about 0.2 mm beneath the surface of the male mold. The diameter of the needles 4 are selected to ensure adequate perforation and preferably lie in the range from 1.0 to 2.0 mm, and each needle 4 is preferably arranged in a guide 22 which extends through the male mold 1, the cooling plate 2 and also a vacuum plate 3 located beneath the latter and shown in FIG. 3.

In FIG. 2 the molded plastic foam sheet 16 is shown, which bears with its inner side 13 against the male mold 1, while its outer side 12 is in contact with the female mold (not shown).

Figure 3:
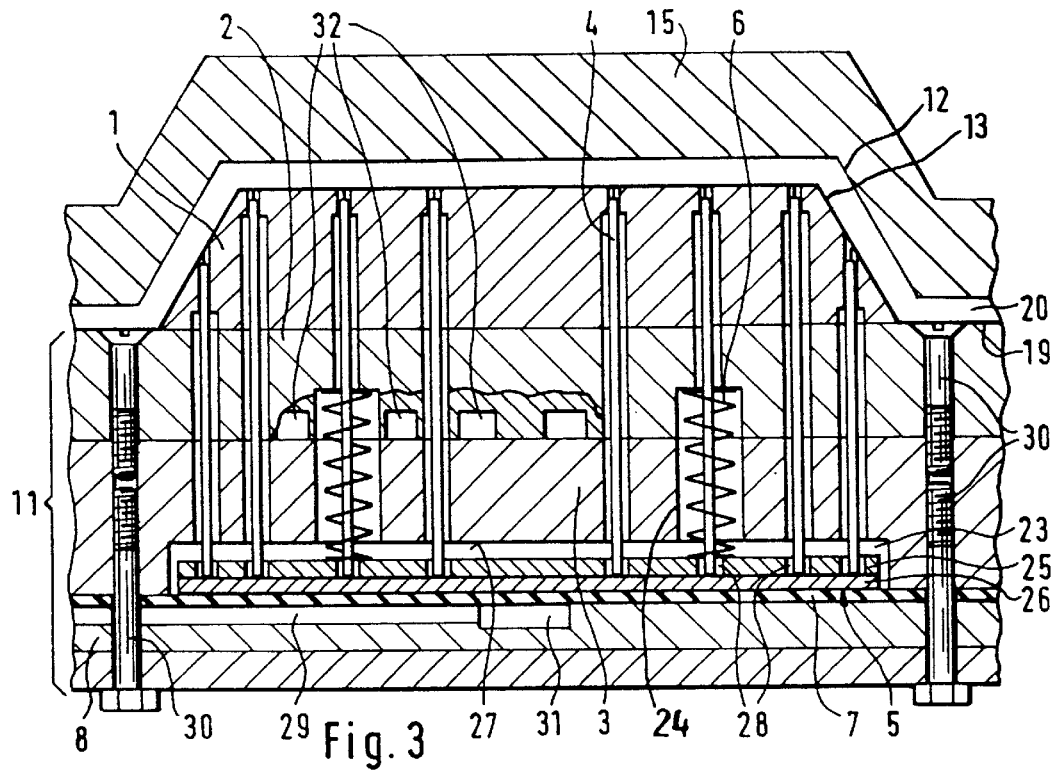
FIG. 3 shows a section through a complete mold block of the apparatus according to one embodiment of the present invention.

As can be seen from FIG. 3, the complete mold block 11 for the inner side of the molded plastic foam sheet comprises the male mold 1, the cooling plate 2, the vacuum plate 3, movable needles 4, a needle plate 5, springs 6 for the return of the needle plate diaphragms 7 and a mounting plate 8, all the parts being held together by fasteners such as screws 30. The male mold 1 is in each case generally shaped in a way corresponding to the product to be produced, i.e., each product has its own male mold 1. As already mentioned in the description of FIG. 2, the male mold 1 is provided with guides 22 for the movable needles 4. These guides 22 can be used on the one hand as guides for the needles 4 and on the other hand as vacuum channels to which a vacuum is applied during the forming of the plastic foam sheet 16. This combined use of the guides 22 has the advantage of being very space-saving and structurally simple, since far fewer holes have to be drilled into the male mold 1 than if guides and vacuum channels are separate. The guides preferably have a predetermined oversize, in comparison with the needle diameter, so for example, the needle diameters are generally about 1.0 to 2.0 mm and the diameters of the guides 22 are generally about 1.4 to 2.4 mm. For rapidly building up the vacuum, the guides 22 within the cooling plate 2 and the vacuum plate 3 are preferably drilled open over a certain length to form cylinder chambers 24 which generally have a diameter of about 5 mm. The material for the male mold 1 is preferably aluminum, but other metals and metal alloys are also suitable for this.

The mold block for the outer side 12 of the plastic foam sheet, or the molded tray 20, has a female mold 15, diagrammatically indicated in FIG. 3, whose surface bearing against the outer side 12 is designed to complement the male mold 1 bearing against the inner side 13. One or both of the mold blocks are movable toward each other to within a distance corresponding to the adjustable wall thickness of the tray 20, the wall thickness of the tray 20 preferably lying in the range from 3.5 to 6.5 mm. Both the female mold and the male mold are preferably respectively mounted on a cooling plate 2, of which in FIG. 3 only the cooling plate of the male mold 1 is shown. The cooling medium water or some other cooling medium flows through the cooling channels 32, which are preferably milled into the underside of the cooling plate 2 and are turned into closed cooling channels by the vacuum plate 3 bearing against the underside of the cooling plate 2. The material of the cooling plate 2 is preferably aluminum, but other metals and metal alloys are also suitable for this.

Milled into the underside of the vacuum plate 3 is a chamber 23, which receives a needle plate 5, comprising two part-plates 25, 26. The guides 22 for the movable needles 4 extend from the chamber 23 through the vacuum plate 3, the cooling plate 2, up to the outer side of the male mold 1. The cross section of the individual guide 22 narrows to the cross section of the needles 4 over a length of preferably about a few tenths of a millimeter, beginning beneath the outer side and ending on the outer side of the male mold 1 or of the mold block 11.

The cylinder chambers 24 extend from the chamber 23 through the vacuum plate 3 up to partially into the cooling plate 2. Accommodated in the cylinder chambers 24 are the springs 6 which enclose the needles 4. The one end of each spring bears under pressure against the top surface of the cylinder chamber 24 and the other end bears under pressure against the associated needle plate 5.

The needles 4 are preferably anchored by their lower ends on the lower part-plate 26 of the needle plate 5. For this purpose, the upper part-plate 25 is provided with holes 28, which preferably have an oversize with respect to the led-through needles 4 in order to ensure a frictionless backlash during the motions of the needles in the holes. The stock material for the needles 4 takes the form of so-called ejector pins of, for example, a nickel—chromium alloy according to DIN 1530or DIN 9861 which are expressly incorporated by reference in their entireties. These ejector pins are cut to the desired length and provided with a tip, whose apex angle is generally between 10 and 60°, in particular 30°. Further preferred apex angles α for the needles 4 are 23° or 27°. The needles 4 are preferably additionally also nickel-plated. The springs 6 serve for returning the needle plate 5 and additionally centering the needle plate. The individual diaphragm 7 is generally clamped between the vacuum plate 3 and a mounting plate 8. The lower part-plate 26 of the needle plate 5 rests directly on the diaphragm 8. The upper part-plate 25 maintains a distance from a top surface 27 of the chamber 23 when pressure on the diaphragm 7 is relieved. As soon as the diaphragm 7 is subjected to pressure, the needle plate 5 as a whole is raised, preferably until the upper part-plate 25 bears against the top surface 27 of the chamber 23. As a result, the needles 4 are pressed upward in the guides 22, so that the needle tips 18 project from the surface of the male mold 1 and penetrate a surface skin 19 of the tray 20. The diaphragm 7 is, for example, an approximately 1 mm thick polyurethane sheet having a Shore hardness A of 70°. The diaphragm 7 is subjected to compressed air via a channel 29 in the mounting plate 8. For this purpose, the channel 29 is preferably connected to a central recess 31 beneath the center of the diaphragm 7. A single diaphragm 7 may drive a plurality of needle plates 5. The number of needle plates is generally dependent on the size of the tray 20 to be molded, or on the product type. The matrix distribution of the needles 4 in the needle plates 5 also depends on the product type. In general, however, it is preferable that each needle plate 5 is actuated by its own diaphragm 7. There may be 3×5 to 6×6 needle plates 5 and associated diaphragms 7 accommodated in a mold block 11. The material of the needle plates 5 is generally stainless steel, but other metal alloys based on iron, nickel and chromium are also suitable for this.

As already mentioned above, when subjected to pressure the diaphragm 7 expands upward and presses the needle plate 5, fitted with the needles 4, upward by about 3 mm, until the upper part-plate 25 preferably bears against the top surface 27 as a stop. The needle tips 18 thereby pierce the thin surface skin 19 on the inner side 13 of the tray 20. After letting out the compressed air, the springs 6 mounted between the needle plates 5 and the top surface of the cylinder chambers 24 bring the needle plates and the diaphragms 7 back into their initial positions. When all the needle plates 5 have resumed their initial positions, the mold of the thermoforming unit opens, the molded and needled tray 20 is pushed out, and a newly heated-up section of the foam sheet 16 is advanced, and the cycle is repeated.

Figure 4:
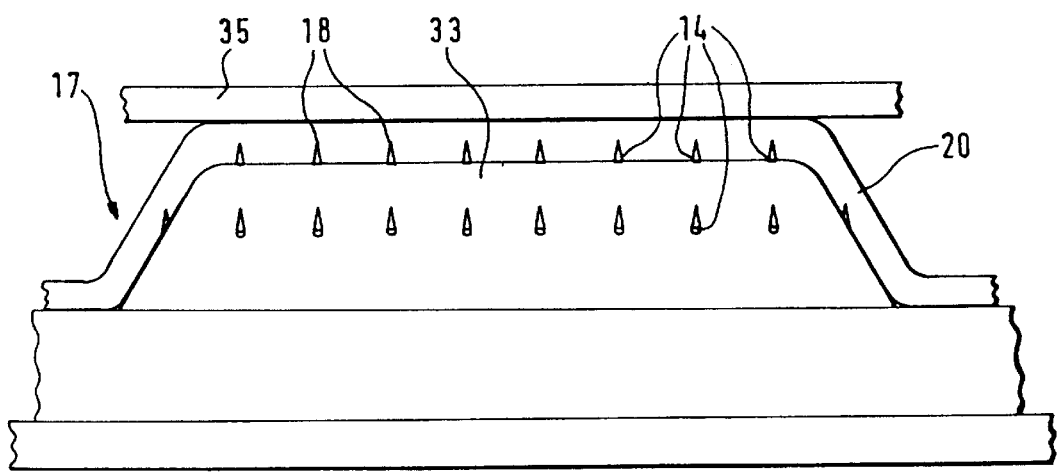
FIG. 4 diagrammatically shows a view of a male mold with fixed needles according to another embodiment of the present invention.
Figure 5:
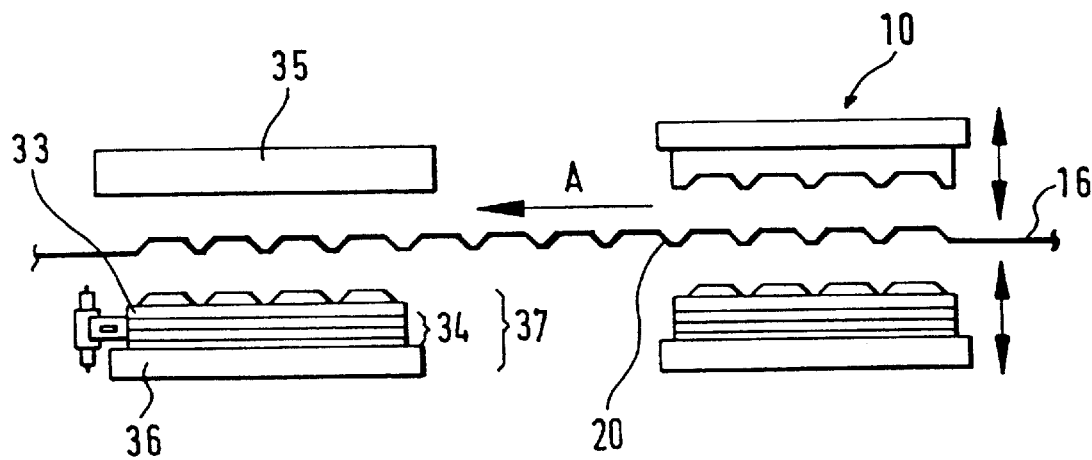
FIG. 5 shows in diagrammatic view a male mold with fixed needles which is arranged downstream of the mold blocks in the thermoforming unit.

FIG. 4 shows another preferred embodiment, which includes a block 17 with fixed needles 14, which is part of a thermoforming unit 10. In FIG. 4 there are only indicated a male mold 33, a planar backing plate 35, the fixed needles 14 and also a tray 20. The tray is located between the male mold 33 and the planar backing plate 35. In the case of this block with fixed needles 14, the latter are preferably mounted fixedly on the male mold 33 according to a predetermined pattern and project a distance to ensure satisfactory perforation, preferably about 3 mm from the surface of the male mold. The production of the individual tray 20 by the thermoforming method proceeds in the same way with this block 17 with fixed needles as the thermoforming method with movable needles, which was explained above with reference to FIG. 3. Apart from the male mold 33, the block 17 comprises a cooling plate and a vacuum plate, in each case not shown. The plastic foam sheet is likewise thermoformed by means of a vacuum on both sides, before it is transported to the block 17 where the fixed needles 14 are perforating the skin on the inner side of the tray 20.

In the case of another embodiment for perforating thermoformed products, such as trays made of plastic foam sheets, the needling takes place after molding of the tray product and outside the mold of the thermoforming unit 10. In the case of this process, which is explained with reference to the diagrammatic FIG. 5, the trays, 20 are passed after the thermoforming of the plastic foam sheet in the thermoforming unit 10 in the direction of the arrow A to a separate mold block 37, mounted in the thermoforming unit. The mold block 37 preferably corresponds substantially to the mold block of FIG. 4 and comprises a male mold 33, a cooling plate 34 and a mounting plate 36. The fixed needles 14 preferably project with their needle tips to 3 mm from the male mold 33 and are anchored by their needle ends either in the male mold 33 or in the cooling plate 34. The outer side of the tray 20 bears against the backing plate 35 during the perforation.

Figure 6:
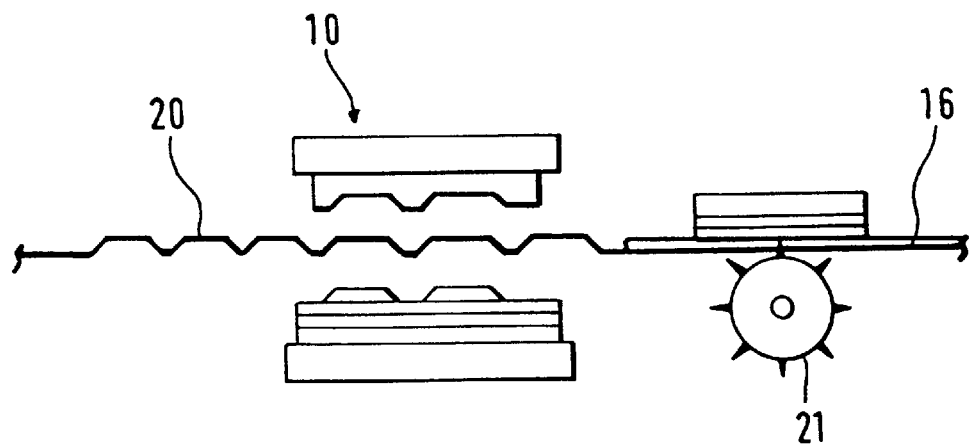
FIG. 6 shows a needle roller with fixed needles and a backing plate for perforating a plastic foam sheet after extrusion and before thermoforming.

With reference to FIG. 6, another preferred embodiment according to the present invention for needling a plastic foam sheet 16 is described. In the case of this embodiment, the plastic foam sheet 16 is preferably perforated with the aid of a needle roller 21 on the inner side before the heating up and the thermoforming in the thermoforming unit 10. The needle roller 21 is provided with fixed needles 14, whose needle tips 18 likewise project to about 3 mm from the roller surface. The needle roller 21 is arranged either at the inlet of the thermoforming unit or at the extruder.

The plastic foam sheet may be colored by the addition of masterbatches during the extrusion. Similarly, it is possible to coextrude the plastic foam sheet together with a colored outer layer of the same or different material as the plastic foam sheet in a tandem extrusion line. Such a coextruded product comprising plastic foam sheet and colored outer layer is heated up after the coextrusion, is thermoformed in a thermoforming unit with the aid of a vacuum on both sides and is thermoset. Subsequently, the outer layer is pierced and the plastic foam sheet is perforated by means of fixed or movable needles. With the coextrudate comprising plastic foam sheet and outer layer, all the operations for thermoforming and perforating by means of needles are carried out by the same apparatus and processes as described above with reference to the figures.

The production of the trays, in particular when using heavy-gauge plastic foam sheets which have a relatively high weight per $m^2$ can similarly take place by thermoforming with deep draw by a vacuum applied on one side. Thermoforming without deep-draw vacuum forming can also be used in the production of trays.

The trays or containers produced from open-cell plastic foam sheets are generally molded, for example, by means of a vacuum, which generally acts on both sides of the plastic foam sheet, and heated in a molding station. After the molding operation, the inner side of the tray has to be perforated, which can be carried out, inter alia, with the aid of needles. The perforation achieves the effect that when the trays are used as receptacles for foodstuff, the liquid discharged by the foodstuff to be packed in the tray, for example the juice of pieces of meat, can be absorbed in the core of the open-cell foam. The perforation of the trays can be carried out during the thermoforming process at two locations, preferably by means of a diaphragm plate in the molding station, as is described with respect to FIGS. 2 and 3, or with the aid of needle pistons which are arranged in the male mold described below. When perforating in the molding station, the perforations should not take place until after the tray has been molded and cooled.

Figure 7:
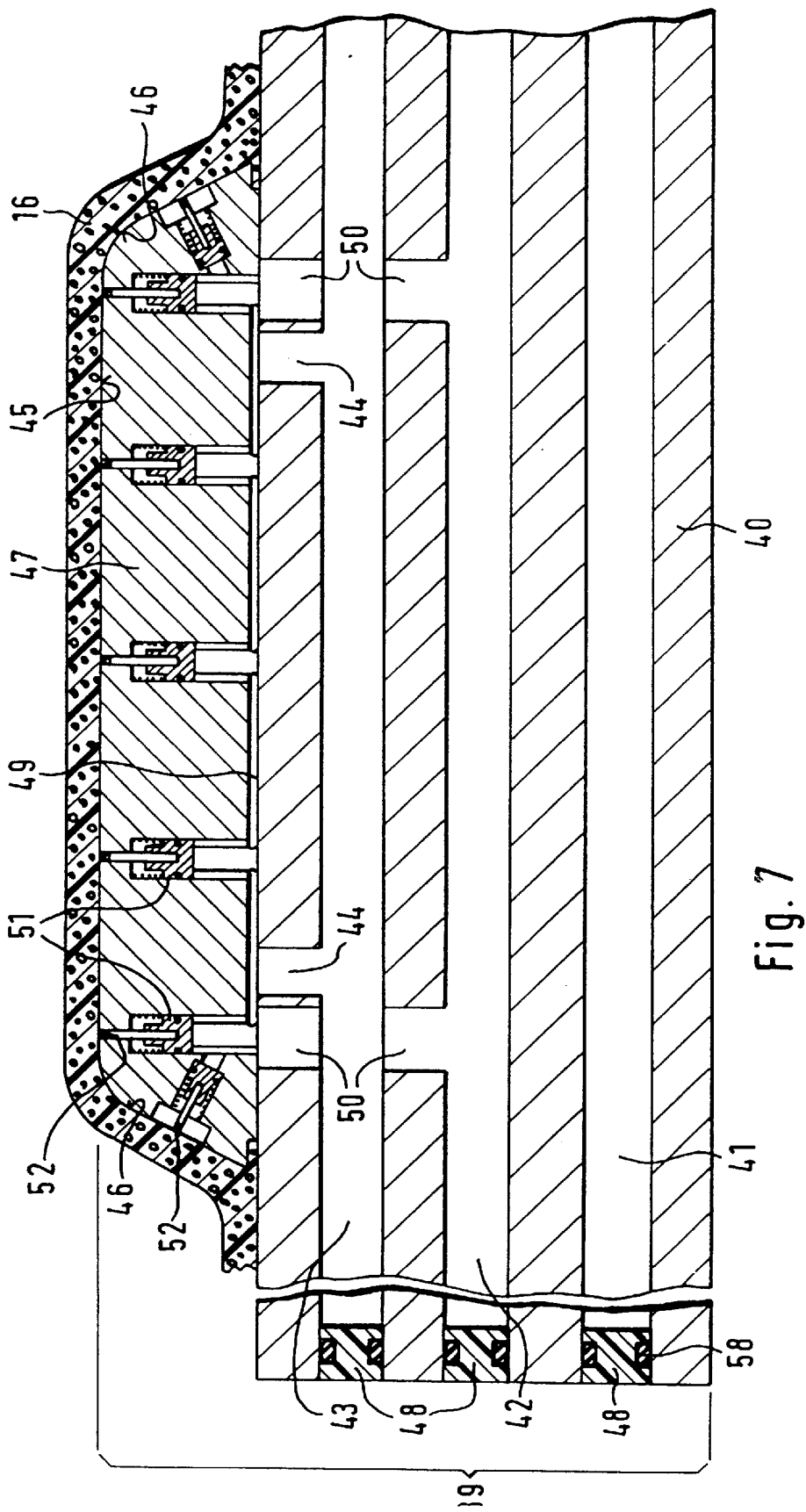
FIG. 7 shows a cross section through another embodiment of the present invention of a mold block comprising base plate and male mold.

FIG. 7 shows a cross-section of another embodiment for perforating at least one smooth closed surface of an open-cell plastic foam sheet which is thermoformed into a tray or into a container. A fixed mold block 39 comprises a base plate 40 and a male mold 47, in which a number of needle pistons 51 are arranged. The male mold 47 has a cross section corresponding to the tray to be molded, which has side walls 46 and a bottom 45. Accommodated in the fixed base plate 40 are mutually parallel channels 41, 42, 43 lying one above the other for a cooling medium, vacuum and for a pressure medium. The channels 41 to 43 are closed off on the one side by plugs 48, which preferably have seals 58. In FIG. 7, there is diagrammatically represented a plastic foam sheet 16 which bears against the upper side of the male mold 47.

The needle pistons 51 within the male mold 47 are preferably directed perpendicularly onto the side walls 46 and the bottom 45 of the tray. When the needles 52 extend out of the needle piston 51 and perforate the plastic foam sheet 16, the advantage is achieved that the perforation of the side walls 46, just like the perforation of the bottom 45, is carried out perpendicularly onto these surfaces. As a result, the perforations can be deeper, in particular in the regions of the side walls, than in the case of the diaphragm plate embodiment, since in the case of the diaphragm plate embodiment, all the needles can extend in the same perpendicular direction onto the bottom of a tray, so that the side walls inclined with respect to the bottom are perforated obliquely with respect to their surfaces. A further distinction and possible advantage of the embodiment described in FIGS. 7 and 8, arises from the fact that the holes in the side walls are largely circular, while in the case of a diaphragm plate embodiment, they are oval or elongate. In some cases, this can result in impairment to the stability of the side walls. Consequently, the risk of damage to the surface of the oblique side walls of a tray may be reduced.

The use of needle pistons 51 makes it possible for different depths of perforation of the holes to be provided in the side walls and in the bottom of the tray. For example, it is possible to perforate the bottom to a depth of, for example, 3 mm and to perforate the side walls in the range from, for example, 2.5 to 3 mm.

The channel 42 for the vacuum is in connection with the interior of the male mold 47 preferably via at least two vertical vacuum connection bores 50. Provided on the underside of the male mold 47 is a distributor channel 49, which is preferably connected via vertical bores 44 to the channel 43 for the pressure medium. The pressure medium is generally compressed air. The needle pistons 51 are in direct connection with the distributor channel 49, so that when the distributor channel 49 is subjected to compressed air via the channel 43 each of the needle pistons is subjected to compressed air. This achieves the effect that, as described in further detail below with reference to FIG. 8, the needles 52 are extended and perforate the bottom and the side walls of the tray molded from the plastic foam sheet 16.

Figure 8:
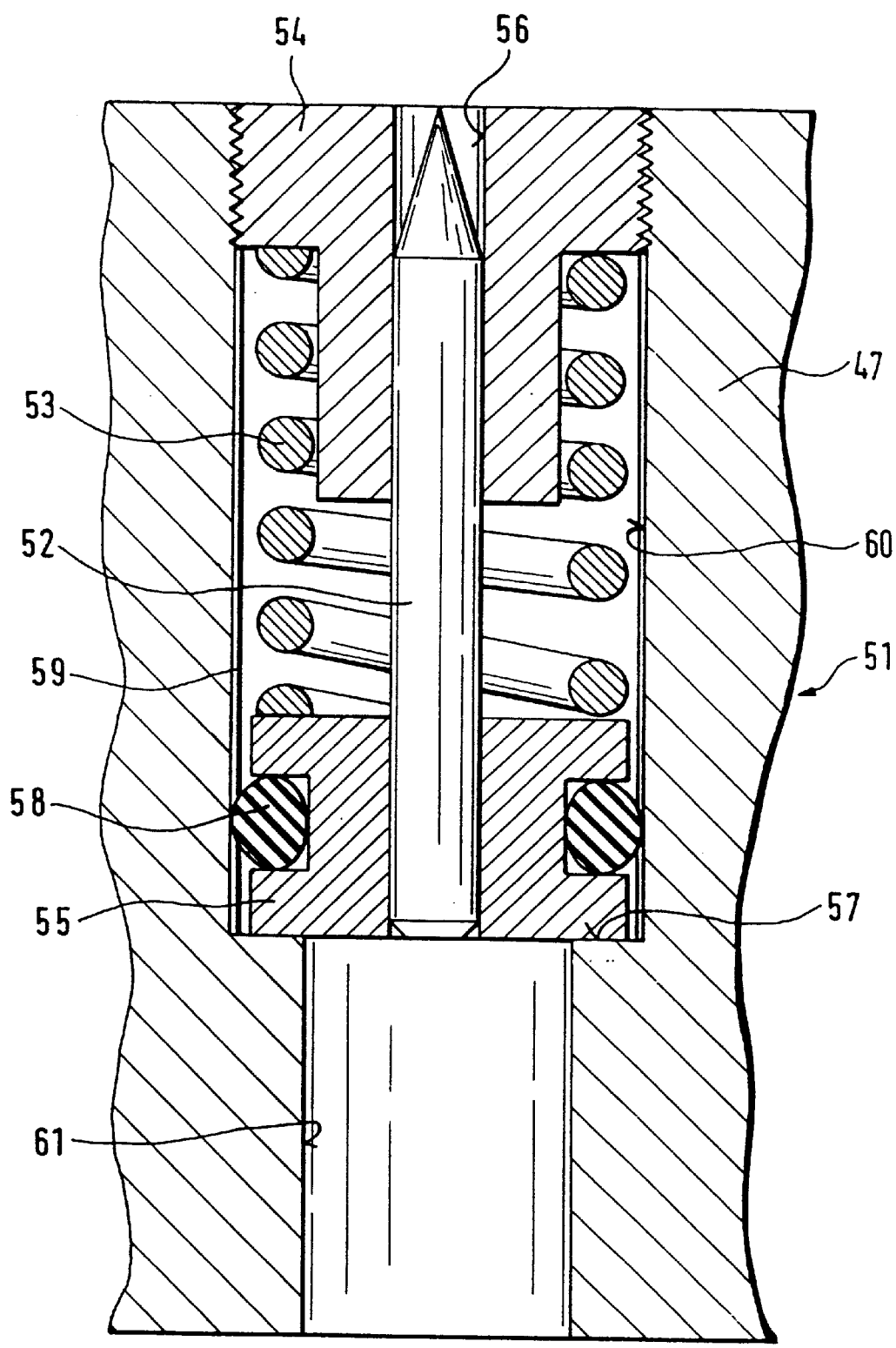
FIG. 8 shows a cross section of a needle piston arranged in the male mold according to FIG. 7.

As FIG. 8 shows, the individual needle piston 51 comprises a T-shaped guide 54, a needle 52, a compression spring 53, a piston cylinder 59 and a piston ring 55 located in the piston cylinder. The T-shaped guide 54 preferably has an external thread and is screwed by this external thread into a cylindrical cavity 60 within the male mold 47. This cavity is preferably offset via a collar 57 with respect to a further cylindrical cavity 61 of smaller diameter, which is connected directly to the distributor channel 49. The guide 54 can include, for example, brass, aluminum or some other metal, but may also be made from plastic or other suitable materials. The compression spring 53 bears with one end against the underside of the T-shaped guide and with its other end against the upper side of the piston ring 55. The piston ring 55 is located in the lower part of the cavity 60 and is sealed off from the side walls of the cavity 60 by a seal 48, for example a ring seal 58.

The upper end of the piston cylinder 59 preferably bears against a horizontal underside of the T-shaped guide 54, while the lower end of the piston cylinder is preferably supported against the collar 57 of the cavity 60 in the male mold 47. The compression spring 53 encloses the needle 52, which slides with its tip inside a bore 56 of the guide 54. The end of the needle is anchored in the piston ring 55. The starting material for the needles 52 preferably takes the form of so-called ejector pins of a nickel-chromium alloy according to DIN 1530D or DIN 9861 described above in connection with another embodiment. These ejector pins are cut to the desired length and provided with a tip, the apex angle of which is generally between 10 and 60°, in particular 30°. Further apex angles for the needles 52 are 23° or 27°. The needles are generally nickel-plated. The compression spring 53 ensures that, when the feed of the pressure medium to the distributor channel 49 is switched off, the needle 52 is completely retracted into the male mold 47, or into the block which forms the male mold. Since the pressure on the underside of the piston ring 55 is discontinued when the feed of the pressure medium is switched off, the spring force of the compression spring 53 is adequate to press the piston ring 55 downward until it comes to rest on the collar 57 and consequently also to press the needle 52, mounted or anchored in the piston ring 55, downward as shown in FIG. 8, so that the tip of the needle comes to lie within the bore 56 of the guide 54.

An embodiment which does not utilize a compression spring is also within the scope of the present invention, the piston ring 55 being subjected to a negative pressure after the switching off of the pressure medium and therefore being drawn back downward, until it comes to rest on the collar 57, and consequently the needle 52 being retracted. For this purpose, a switchable three-way valve may be connected between the pressure channel 43, the vacuum channel 42 and the vacuum connection bore 50. This three-way valve then switches over from the pressure channel to the vacuum channel for the withdrawal of the needles.

The perforation of a thermoformed tray by the embodiment exemplified in FIGS. 7 and 8 proceeds as follows:

As soon as the plastic foam sheet 16 rests on the male mold 47, the male mold closes and so too does a female mold (not shown), and a vacuum is applied to the plastic foam sheet 16 both via the male mold and via the female mold. With the aid of this vacuum, the product, whether a tray or container, is molded 100%. The male mold and the female mold are continuously cooled or controlled in their temperature, and after a predetermined cooling time compressed air is fed intermittently to the distributor channel 49 via the channel 43 for the pressure medium and consequently all the needle pistons 51 in the male mold 47 are simultaneously subjected to compressed air. This compressed air presses the piston ring 55 upward in the cavity 60 against the spring force of the spring 53, so that the needle tips of the needles 52 emerge from the surface of the male mold 47 and perforates the bottom 45 and the side walls 46 of the tray. In this operation, the compression spring 53 is pressed back by the surge of compressed air. Thereafter, the compressed air feed line is vented, and the male mold and female mold are opened. The piston ring 55 is pressure-relieved upon venting of the compressed air feed line, so that the compression spring 53 can press the piston ring 55 downward until it bears against the collar 57, whereby the tips of the needles 53 are withdrawn into the bores 56 of the guides 54 and the next perforation operation can start.

Figure 9:
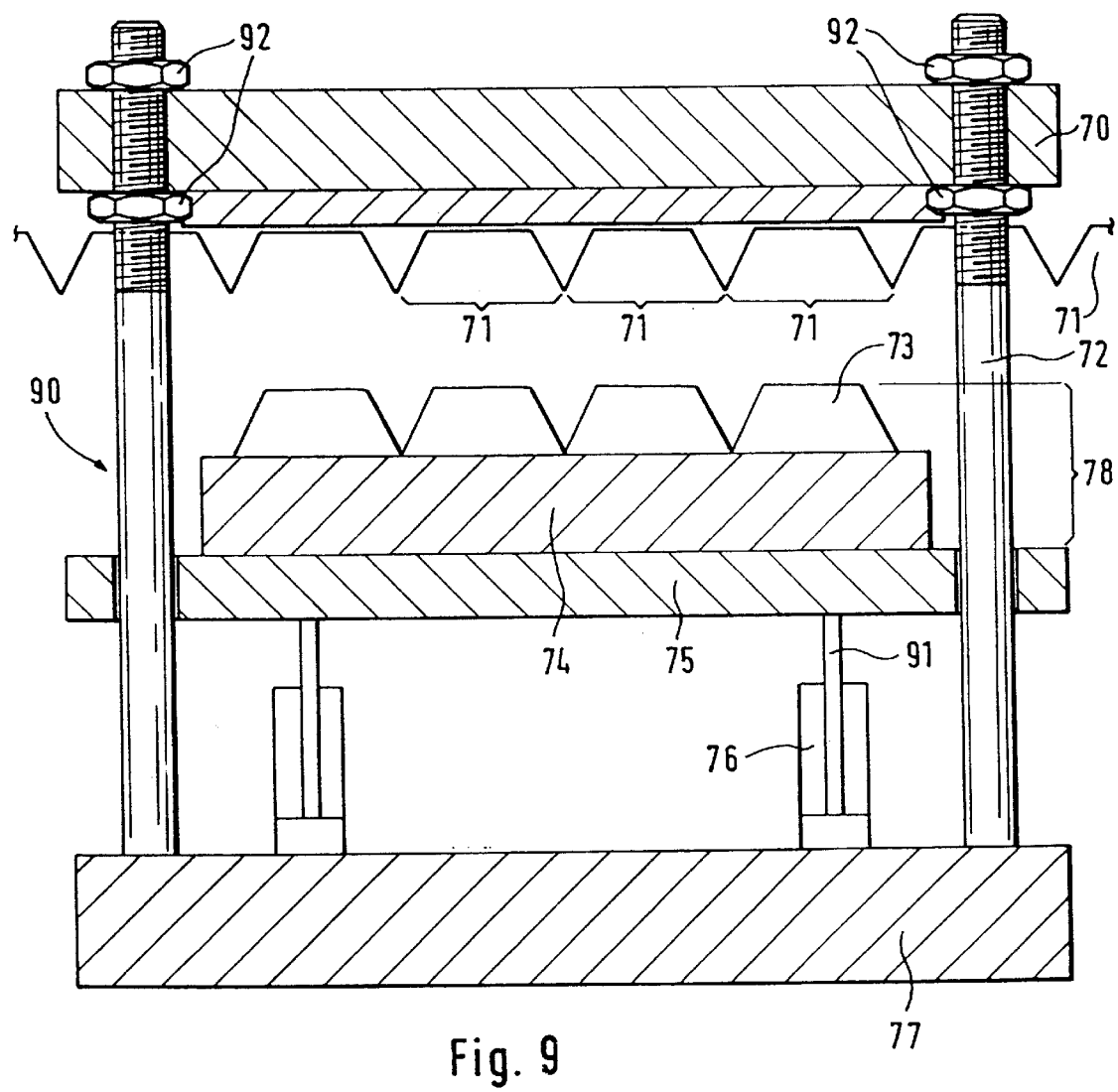
FIG. 9 shows a diagrammatic view of still another embodiment of the present invention for perforating smooth, closed surfaces of plastic foam sheets with open-cell core.

FIG. 9 shows a section through a further embodiment for perforating at least one smooth, closed surface of a plastic foam sheet, referred to from now on also as a perforating station. The perforating station 90 comprises a base frame 77, on which vertical guide rods 72 are preferably fastened, along which a mounting plate 75 can be displaced. Mounted at the upper end of the guide rods 72 is a pressure plate 70, which can be set in its height on the guide rods 72. The pressure plate 70 is fixed in its position by means of screw nuts 92, which respectively bear flush against the upper side and underside of the pressure plate 70. Arranged on the mounting plate 75 is a mold block 78, which comprises a base plate 74 and perforating blocks 73.

The plastic foam sheet, with the thermoformed products 71, such as for example trays or containers, transported from the thermoforming unit to the perforating station 90 bears horizontally against the underside of the pressure plate 70, and the mounting plate 75 with the perforating blocks 73 can then be raised in the direction of the pressure plate or plastic foam sheet to such an extent that the needles arranged in the perforating blocks can penetrate into the inner sides of the products. The height at which the pressure plate 70 is fixed in position on the guide rods 72 depends on the respective depth of the products. With different depths of the products, the height position of the pressure plate 70 on the guide rods 72 also varies in each case. As a result, it is possible to maintain in each case an unchanged lift for the mounting plate 72 if the depth of the products varies from batch to batch.

Arranged on the base frame 77 are drive cylinders 76 preferably electropneumatic or electromechanical, whose piston rods 91 bear against the underside of the mounting plate 75 and raise the latter according to the predetermined lift or, after completion of the perforating operation, lower it.

Figure 10:
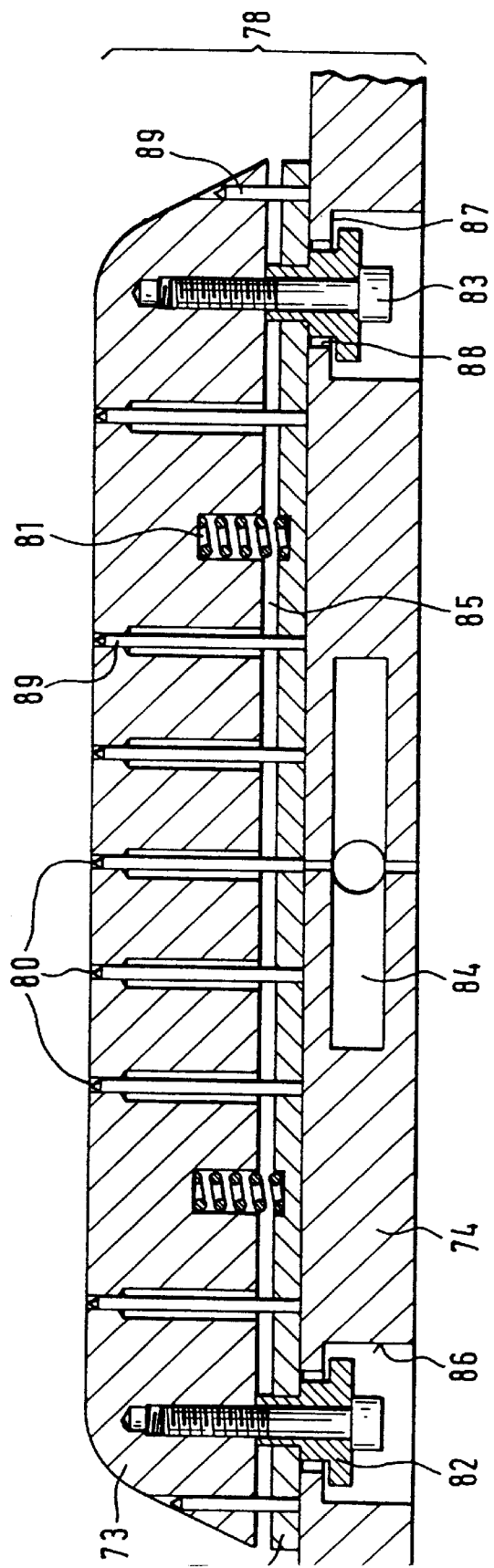
FIG. 10 shows a detail from a mold block, comprising a part of a base plate and a perforating block of the apparatus shown in FIG. 9.

As can be seen from FIG. 10, the mold block 78 substantially comprises the base plate 74, perforating blocks 73 and a needle plate 79, which is accommodated in a pressure medium chamber 85 between the base plate and the perforating blocks. The base plate 74 preferably has cylindrical holes 86, 88 which are arranged one above the other, have different diameters and are connected to one another via a shoulder 87. Fitted in the holes are guiders/spacers 82, which are connected to the perforating blocks 73 by means of fastening screws 83. The fastening screws 83 pass centrally through these guiders/spacers 82. The outline of the guiders/spacers 82 is matched to the outline of the cylindrical holes 86, 88. The guiders/spacers 82 are led through the needle plate 79 and bear with their end surfaces flush against the underside of the perforating blocks 73.

In FIG. 10 only a single perforating block 73 is shown, but there can be a number of perforating blocks provided on the base plate 74 in a matrix arrangement, as is also disclosed by the diagrammatic view of the perforating station 90 in FIG. 9. The needle plate 79 does not completely fill the pressure medium chamber 85, which during the perforation operation is subjected to a pressure medium, such as compressed air; rather, there is a gap or a backlash between the upper side of the needle plate and the underside of the perforating blocks. The size of this gap also determines to what extent the needle tips emerge from the surface of the perforating blocks 73, as will be further described below.

The needles 89 are firmly anchored by their lower ends in the needle plate 79 and form within the individual perforating block 73 a needle matrix 80 which preferably comprises a rectangular or square arrangement of rows of needles. In the individual perforating block 73 there are blind holes, for example four of them, which form corner points of a rectangle or of a square and into which compression springs 81 are fitted. The one end of each compression spring 81 is preferably supported against a depression in the upper side of the needle plate 79 and the other end of each compression spring is preferably supported against the terminating surface of the corresponding blind hole.

In the rest position, the perforating blocks 73 are kept at a distance from the needle plate 79 by the compression springs 81. The dimensioning of the guiders/spacers 82, which are designed like a bush, ensures that the tips of the needles 89 terminate with the surface of the perforating blocks 73 and, furthermore, that a predetermined distance is maintained between the needle plate 79 and the perforating blocks 73. This distance corresponds to the depth of perforation by which the needles penetrate into the products, and is preferably for example 2.5 to 3 mm. Greater depths of perforation are also possible, on the condition that complete puncturing of the walls of the product is avoided.

In the base plate 74 there is preferably a channel 84 for a pressure medium, which is connected to a pressure source (not shown), which supplies compressed air, for example. The channel 84 is in connection with the pressure medium chamber 85 via vertical bores. In the base plate there are, furthermore, channels for the pressure medium (not directly shown) which are milled, preferably to a depth of 0.5 mm. The length and width of these channels depends on the dimensions of the products. The channel 84 is in connection with the other channels for the pressure medium.

The perforation operation by the embodiment exemplified in FIGS. 9 and 10 proceeds as follows:

As soon as the plastic foam sheet with the thermoformed products 71 bears against the underside of the pressure plate 70, the mounting plate 75 is raised by the drive cylinders 76, so that the perforating blocks 73, which are fastened together with the base plate 74 on the mounting plate 75, approach the inner sides of the products. When the perforating blocks 73 have finally pressed the products 71 against the pressure plate 70, a compressed air surge takes place via the channel 84 and the channels which are not shown but are in the base plate 74 onto the underside of the needle plate 79. As a result, the needle plate 79 is raised against the spring force of the compression springs 81 until it stops against the underside of the perforating blocks 73. If there is adequately high compressed air pressure, the needle plate 79 moves in a freely suspended manner against the perforating blocks 73.

The needles 89 anchored in the needle plate 79 then emerge from the surface of the perforating blocks 73 and penetrate into the inner walls of the products 71, the depth of the preferred perforation corresponding, as already mentioned above, to preferably exactly the distance between the upper side of the needle plate 79 and the underside of the perforating blocks 73. The free suspension of the needle plate causes a self-centering of the needles. This also applies to the fitting of the perforating blocks 73 into the products 71, which causes a self-centering of the perforating blocks in the molded products. In this case, small deviations of up to ±2 mm, caused by shrinkage of the plastic foam sheet and changes in the length of lay of the sheet web, can be compensated. The length of lay is expressly defined as the length of the plastic foam sheet required for one thermoforming cycle.

Once the needles 89 have perforated the products, the mounting plate 75 and the perforating blocks 73 provided thereupon are lowered and the compressed air feed is switched off. The needle plate 79 is then pressed by the compression springs 81 against the base plate 74, so that the needles 89 are withdrawn from the inner sides of the products. As soon as the mounting plate 75, or the perforating station 90, has assumed its initial position, the plastic foam sheet with the perforated products 71 is transported further, and a new perforating operation can be initiated.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. A process for perforating an open-cell plastic foam sheet having two smooth closed surfaces, which comprises:

heating an extruded foam sheet to a predetermined temperature;

thermoforming the sheet into a predetermined configuration to form a molded thermoformed foamed plastic sheet;

thermosetting the thermoformed foam sheet;

perforating one of the smooth, closed surfaces with the needles of the movable part of an apparatus for perforating one or more smooth, closed surfaces of open-cell plastic foam sheets, which apparatus comprises a movable part which comprises a male mold having needles arranged thereon in a matrix arrangement, wherein the part is adapted such that during the perforating the needles with their needle tips project from the surface of the part to such an extent that they pierce a surface skin of the plastic foam sheet and do not pierce the opposing surface skin; and cooling the thermoformed molded foamed sheet after the thermoforming to form a tray or container having side walls and a bottom surface, and wherein the perforating further comprises perforating the side walls and bottom surface with said needles in a direction perpendicular to the bottom.

2. A process as claimed in claim 1, further comprising extruding the open-cell plastic foam before perforation.

3. A process as claimed in claim 2, wherein the extruding further comprises coextruding an uncolored or colored outer layer with the plastic foam sheet whereby the uncolored or colored layer forms one or more of the two smooth closed surfaces of the plastic foam sheet.

4. A process as claimed in claim 2, wherein the plastic foam sheet is extruded from colored or uncolored material.

5. A process as claimed in claim 1, wherein at least one of the two smooth, closed surfaces comprises a surface skin, and wherein the perforating further comprises arresting the plastic foam and moving the needles from an initial position to a position which pierces the surface skin of the arrested foam plastic sheet.

6. A process as claimed in claim 1, wherein at least one of the two smooth, closed surfaces comprises a surface skin, and wherein the perforating further comprises moving the male mold block, having the needles with projecting needle tips disposed in a fixed position therein, toward the surface skin of the plastic foam having the outer side bearing against a backing plate to such an extent that the needle tips perforate the surface skin.

7. A process as claimed in claim 1, wherein the thermoforming, cooling and perforation occur in a thermoforming unit.

8. A process as claimed in claim 1, wherein the side walls and bottom surface are perforated to the same or different depths.

9. A process as claimed in claim 7, wherein the movable part comprises the male mold having needles and the needles are fixed on a needle plate which is displaceably mounted in retracted configuration in a male mold of the thermoforming unit, and wherein the needles are extended from the male mold by means of a compressed gas and are retracted into the male mold by spring means when the compressed gas is terminated, and wherein the perforating further comprises;

supplying the compressed air to the needle plate to extend the needles from the male mold;

perforating the tray or container; and terminating the compressed air supplied to the needle plate to retract the needles into the male mold by said spring means.

10. A process for perforating an open-cell plastic foam having two smooth closed surfaces, which comprises:

heating an extruded foam sheet to a predetermined temperature;

thermoforming the sheet into a predetermined configuration to form a molded thermoformed foamed plastic sheet;

thermosetting the thermoformed foamed plastic sheet;

transporting the thermoformed plastic sheet out of a thermoforming unit and into a perforating station, wherein the perforating station comprises an apparatus for perforating one or more smooth, closed surfaces of open-cell plastic foam sheets, which apparatus comprises a fixed pressure plate, a movable part which comprises a male mold having needles which includes at least one displaceable perforating block and at least one needle plate having fixed needles mounted thereon, said needle plate being mounted below said perforating block;

pressing the thermoformed foam sheet against the fixed pressure plate by the at least one perforating block; and raising the at least one needle plate in a freely suspended manner by means of a pressure medium against the at least one perforating block to press the needle tips against the thermoformed plastic foam to pierce the surface of the smooth closed surface which is in at least partial contact with the at least one perforating block, wherein the needle tips do not pierce the opposing surface skin, and wherein the thermosetting occurs before or after perforation.

11. A process as claimed in claim 10, wherein the pressing further comprises raising the at least one perforating block until it is in tight sealing contact with the molded plastic foam, wherein the at least one perforating block centers itself in the molded plastic foam while it is suspended.

12. A process as claimed in claim 10, wherein the pressing further comprises raising the at least one perforating block against the fixed pressure plate, with a lift which can be set, wherein the lift includes an electropneumatic or electromechanical drive cylinder means.

13. An apparatus, for perforating one or more smooth, closed surfaces of open-cell plastic foam sheets, wherein the apparatus comprises a movable part which comprises a male mold having needles arranged thereon in a matrix arrangement, wherein the part is adapted such that during a perforation operation the needles with their needle tips project from the surface of the part to such an extent that they pierce a surface skin of the plastic foam sheet and do not pierce the opposing surface skin, wherein the male mold is arranged outside a thermoforming unit in a thermoforming device and is adapted to be pressed with its projecting needle tips against and to perforate the inner side of the foam sheets thermoformed to trays in the thermoforming unit and wherein the apparatus further comprises a backing plate disposed such that the outer side of the tray bears against the backing plate during the perforation of the tray.

14. A process as claimed in claim 1, wherein the perforating further comprises perforating the side walls and bottom surface with said needles in a direction perpendicular to the side walls and perpendicular to the bottom surface.

* * * * *